March 19, 1957 P. S. WARD 2,785,642
METHOD FOR PROOFING AND BAKING BREAD
Filed Nov. 7, 1952 2 Sheets-Sheet 1

INVENTOR.
Paul S. Ward.
BY Wood, Herron & Evans,
ATTORNEYS.

March 19, 1957 P. S. WARD 2,785,642
METHOD FOR PROOFING AND BAKING BREAD
Filed Nov. 7, 1952 2 Sheets-Sheet 2
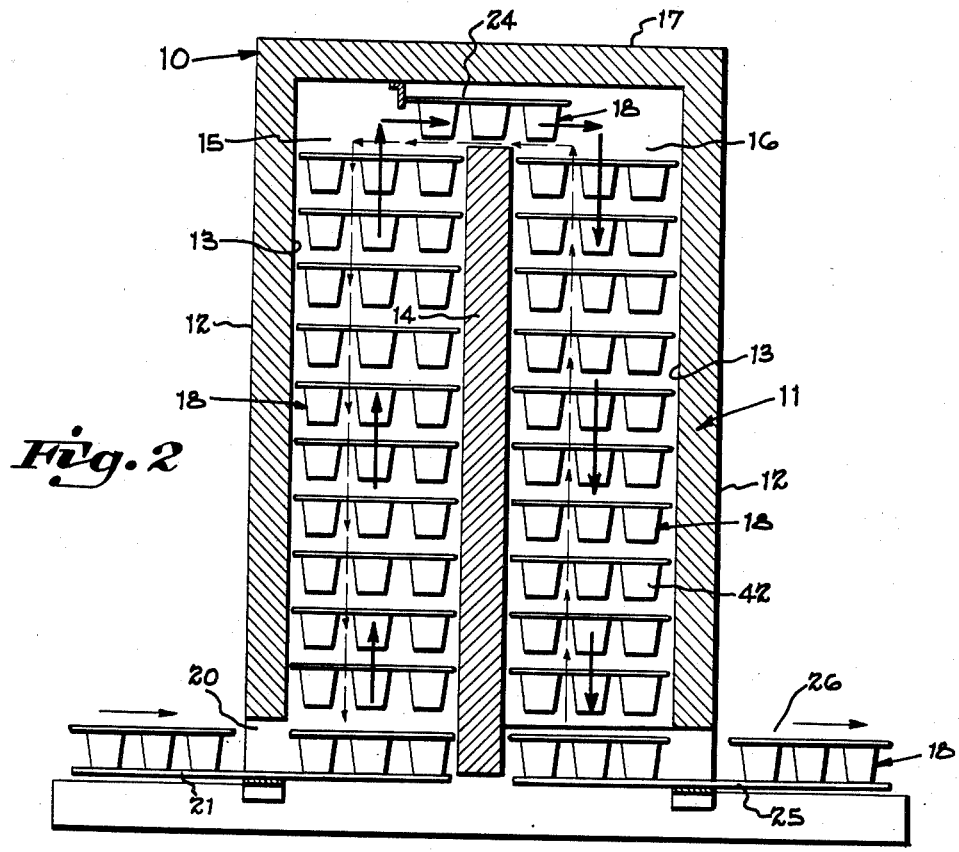
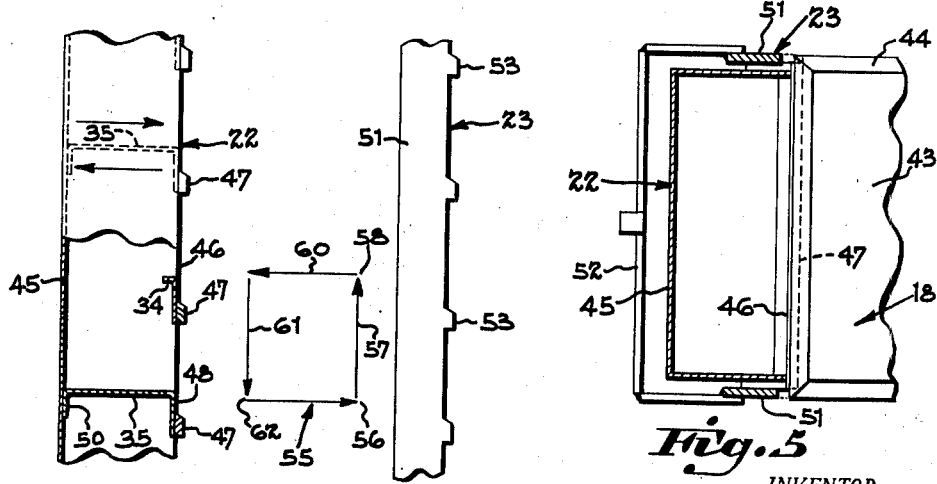
INVENTOR.
Paul S. Ward.
BY Wood, Herron & Evans
ATTORNEYS.

United States Patent Office 2,785,642
Patented Mar. 19, 1957

2,785,642

METHOD FOR PROOFING AND BAKING BREAD

Paul S. Ward, Cynthiana, Ky.

Application November 7, 1952, Serial No. 319,317

8 Claims. (Cl. 107—54)

This invention relates to the art of producing bread and is particularly directed to a novel process for proofing and baking bread and to a novel oven in which this process can be carried out.

In conventional bakery practice where bread, rolls and the like are produced by quantity production methods, the dough is first separated into lumps by a divider and the lumps are rounded into balls by a machine known as a rounder, after which the balled lumps are transferred to a rest proofer where the dough is permitted to recuperate from the severe treatment which it received in the rounder. From the rest proofer the dough lumps are fed into a molder where the dough lumps are flattened and elongated to form thin sheets each of which is then curled into a scroll and deposited in a baking pin. During the sheeting process the dough is compacted to eliminate any large holes or voids so as to achieve a uniform porosity. When these thin sheets of dough are deposited in the baking pans they occupy only a small fraction of the volume occupied by the finished loaf.

After the dough has been placed in the baking pans, the pans are transferred to a proof box where they remain for a period of from 35 minutes to an hour and 15 minutes, the exact length of time, depending upon such factors as the size of the loaf, the nature of the dough, the conditions within the proof box, and so forth. Generally, steam is injected into the proof box to maintain a warm and substantially saturated condition; for example, a temperature in the neighborhood of 90 degrees and relative humidity of 90 percent. The dough is maintained in this environment until it has risen or expanded to about two thirds of its final volume. This process is known as proofing and it essentially involves the generation of gas from the yeast within the dough, the gas being occluded in the gluten which forms a plurality of elastic envelopes. Also dehydration and tough skin formation are prevented while the dough is expanding.

After the dough has risen the desired amount, it is transferred to an oven where it is subjected to high temperatures generally of the order of 400 to 500 degrees for approximately 45 minutes. While in the oven, the bread further expands due to "oven spring" until it reaches full loaf size. During the baking process, the starch is made soluble, the ferment is killed, a portion of the moisture contained in the dough is driven off, and a brown crust is formed on the outer surface of the loaf.

The process of baking bread in a bakery is largely a mechanization of the time honored method of baking bread by hand. This method has long been followed by housewives in preparing homemade bread, and as outlined in Ann Pillsbury's Baking Book, this method consists of: mixing the ingredients, then kneading the dough on a floured board for approximately 5 minutes to obtain a fine grain. The dough is next placed in a greased bowl which is covered and placed in a warm (85 to 95° F.) atmosphere until the dough has risen so that its bulk is doubled. After the dough has risen a requisite amount, its center is punched down by plunging the fist in the center of the dough mass. The edges are then folded toward the center, and the dough is turned upside down in a bowl and covered. The dough is allowed to rise in a warm place for about a half hour before it is placed on a floured board and molded into balls. The balls are allowed to rest, closely covered, for 15 minutes before they are shaped into loaves and placed in greased bread pans. The bread pans are then covered with a damp cloth and stored in a warm place until the dough in each of the pans fills the pan with its center being well above the pan top. This requires about an hour and a quarter. Finally the damp cover is removed and the dough is placed in a moderately hot oven, 375°, where it is baked for about 45 minutes.

The present invention is directed to that portion of the bread making process which occurs after the dough has been sheeted and panned, or after the corresponding hand steps of rolling into balls, shaping, and placing the balls into pans. This portion of the process is generally referred to as proofing and baking.

It is the concept of this invention to eliminate low temperature proofing of the dough as it has heretofore been carried out. Instead the dough is placed directly from the molder into the oven where it is subjected to continuously increasing temperatures and is in a sense proofed and baked simultaneously.

I have discovered that a piece of dough may be proofed and baked in this manner in a time less than the time previously required for baking alone. Consequently, one of the principal advantages of the present invention is that bread can be baked in about half of the floor time previously required to produce a finished loaf of bread after the dough has emerged from the molder.

One preferred manner of carrying out my process involves placing the dough in loosely covered pans which are moved in countercurrent relationship with a stream of warm air. The air is heated as it enters the oven, and constitutes the sole source of baking heat. The air gives up a portion of its heat to each of the pans of dough over which it passes. As a result, the dough entering the oven is enveloped by air at a relatively low temperature, for example 120 degrees. As the dough progresses through the oven, the pans come into contact with warmer and warmer air until as they are ready to emerge, the pans are in contact with air at the highest desired baking temperature. This temperature may be of the same order as previously employed, or as I will explain later, it may be considerably lower; for example 350 degrees.

When treated in this manner the dough is simultaneously heated and proofed. That is, during the initial period in which the dough is in the oven, it blooms to its fullest volume and during approximately the same time the center portion, or core, of the loaf is heated to full baking temperature of approximately 210 degrees. This consumes approximately the first half of the oven time. During the remaining oven time the dough is completely baked and is partially dehydrated to form an even crust on each of its six sides.

I have determined that the paradoxical result, that unproofed dough, placed in a low temperature oven and then subjected to progressively increased temperatures, is baked in a lesser time than proofed dough which is inserted directly into a high temperature oven, is due to the highly changeable heat transfer properties of the dough mass. As previously explained in the conventional baking process the dough is proofed to approximately two-thirds of its final volume before insertion into the oven. Dough which is thus proofed includes a large number of small gas-filled envelopes. In this state the dough is an excellent insulator.

In order to effect complete baking of the loaf the temperature of the core or center portion of the loaf must be raised to approximately 210°. This temperature rise is brought about by heat flowing through the dough from the outer surface to the center. By first proofing the dough and thus converting the loaf into a good insulator, the time needed for the required amount of heat to flow inwardly is tremendously increased. A second factor, tending to increase the baking time, is that by far the largest quantity of heat will flow into the core through the shortest dimension of the loaf. However, by proofing, prior to baking, this dimension (half the width of the loaf) has been increased to substantially that of the finished product. Thus not only is a good insulator interposed between the core and the source of heat, but also the size of the insulator has been increased to further impede heat transfer. Additionally the conventional proofing process results in appreciable amounts of condensate forming on the surface of the loaf, and a substantial amount of heat which otherwise could be used for heating the core is wasted in evaporating this condensate.

In the present process the dough is heated and the cooking or baking process started while the dough is still in a compact lump and is therefore in its optimum condition for heat transfer. Not only does the compaction of the lump result in a higher heat transfer coefficient of the dough, but in addition, the length of the path which heat must travel to reach the core is considerably reduced. A substantial portion of the heat required to elevate the core temperature is supplied to the core while the dough is in this condition; that is before the dough has become porous and expanded to loaf size. As a result the heat flows more rapidly and travels a shorter path so that the dough is raised to baking temperature much more rapidly than if it were previously proofed.

Further, there is no condensate formed on the loaf and consequently no heat is needed to evaporate condensed moisture on the loaf before dehydration and crustation can take place. As a result, not only is the baking time reduced, but appreciably less heat is required to bake each loaf of bread. Furthermore a considerable amount of valuable floor space, formerly occupied by the proofer is now free for the installation of other equipment.

Another advantage of baking bread in a countercurrent of warm air is that the temperature differential between the dough and the surrounding air remains substantially constant throughout the entire proofing and baking period. Thus, for example, if dough at room temperature is placed initially into a stream of 120° air, and finally emerges with a surface temperature of approximately 340° from a stream of 350° air, the temperature differential is only varied from 45 to 10°. Compare this with the differential involved when 80° dough is placed in a 500° oven and is allowed to reach a surface temperature of 375 to 400° before removal. In this case, the temperature gradient varies from a value of 420° down to a value of 100 to 125°. A relatively constant temperature gradient is beneficial in two respects. In the first place, it provides a uniform, even baking action, and secondly, it gives rise to a thermodynamically efficient heat transfer.

Not only is bread baked in accordance with the present invention more quickly and more cheaply produced, but the loaf itself is of a superior quality. For example, I have discovered that a three pound loaf of bread baked in accordance with my invention will weigh one and one quarter ounces per pound more than a loaf baked in a conventional manner from identical dough. The additional weight is due to the amount of moisture retained in excess of the amount conventionally retained. This moisture will give the loaf a quality of freshness for an extended period of time. Also a superior crust formation has been obtained by baking bread in accordance with the principles I have outlined above. That is, an even tasty crust is formed on all six sides of the loaf and there is no light line along the top of the loaf due to a shadow of convection as is normally encountered in conventional pan bread at pan height.

It is another object of this invention to provide a vertical oven in which dough may be proofed and baked in accordance with the method just outlined. In general, the oven includes two vertical chambers which are separated from one another by a vertical wall extending substantially the height of the oven, but being spaced from the top to permit communication between the two chambers. The baking pans for use with this oven, are grouped into "straps" each of which is constituted by several pans arranged in side by side relationship and joined at their upper edges by a large plate, the plate and pans presenting a continuous surface. The straps of pans are serially inserted in the oven near the bottom of one of the chambers, and are then shifted in step by step movements upwardly to the top of the chamber where they are transferred across the center wall and then caused to descend in a step by step movement within the second chamber to a point near its bottom where they are removed from the oven. Hereafter, the chamber in which the pans ascend will be called the "up" chamber, and the chamber in which they descend the "down" chamber.

The oven also includes means for introducing warm air into the lower portion of the down chamber near the point at which the pans are discharged. The warm air passes in a circuitous fashion upwardly between the straps of pans. The pans, together with the mechanism for supporting them, serve as baffles to direct the air flow, so that the warm air travels in one direction between one pair of vertically adjacent pan straps and then reverses its direction to flow between the next upwardly disposed pair of pan straps. The gas thus flows back and forth in the down chamber, each traverse being made at a higher level. When the gas reaches the top of the oven, it passes across the dividing wall and then flows downwardly in a serpentine fashion, between the straps of pans in a manner similar to that in which it flowed in the down chamber. Finally, the gas is withdrawn from the bottom of the up chamber by an exhaust column which is effective to provide a stack effect for drawing the warm air through the oven.

No heat is supplied to the oven except that furnished by the warm air. As a result, the temperature at the charging opening is relatively low since the greater portion of the heat in the air has been given up to the pans over which it has passed. As the pans progress through the oven however, they encounter warmer and warmer air until by the time they reach the discharge opening they are surrounded by air at the maximum baking temperature.

One of the principal advantages of the present oven is that it requires a minimum amount of floor space in the bakery. At the present time, the most common type of oven employed commercially for baking bread is a traveling hearth oven. A traveling hearth oven is constructed of refractory material, and is generally in the form of a long tunnel which often extends 125 feet. Heat is continuously supplied to the lower portion of the oven while the pans slowly progress from one end to the other. The entire oven is maintained at substantially the maximum baking temperature.

In contrast with this, the oven of the present invention requires only a minimum amount of floor space, for example 25 square feet, and employs to a full extent the overhead space which would otherwise be wasted.

A further advantage of my oven is that the pans do not contact any heated surface, so that the pans remain free from hot spots which would cause localized areas of the bread to burn. In the present oven, heating is accomplished solely by convection currents of turbulent air; the air in contact with any particular strap of pans raises the entire strap to a substantially uniform temperature so that the bread is evenly baked. This is in sharp contrast with a conventional hearth oven, where unevenness of the hearth and pan bottoms results in certain areas of the pans absorbing more heat than other portions, so that uneven baking and sometimes burning of the loaf occurs.

Another extremely important advantage of the present oven is that there is substantially less heat wasted than in a conventional hearth oven where a tremendous quantity of heat spills out of the two end openings. The heat losses in hearth ovens are so large that hoods are generally provided to collect the escaping hot gases and channel them to a stack. In the present oven, there are practically no "spill-out" losses; the gases are drawn away from the pan discharge opening by the prevailing draft, and by the time they reach the pan charge opening, they have given up almost all of their heat so that little heat is lost there.

One of the principal construction features of the present oven is the arrangement of the pans, and the pan moving mechanism, whereby the pans and moving mechanism function as baffles to direct the warm air flow through the oven. The air is channeled so that its path is several times as long as the path of the pans. In the embodiment herein illustrated for example, the air travels approximately ten times the distance that the pans move. Consequently, every portion of the air stream contacts a maximum amount of pan surface, and optimum heat transfer conditions prevail.

Other objects and advantages of the present invention will be apparent from the following detailed description of the drawings in which:

Figure 2 is a diagrammatic vertical cross sectional view through a bake oven taken at right angles to the section at Figure 1, showing both the "up" and "down" chambers.

Figure 3 is a view of the hold ladders, partially broken away to show the baffle plates.

Figure 4 is a partial view of a lift ladder and a schematic representation of its movements.

Figure 5 is a horizontal cross sectional view through the hold and the lift ladders showing the manner in which they engage the pans.

Figure 1:
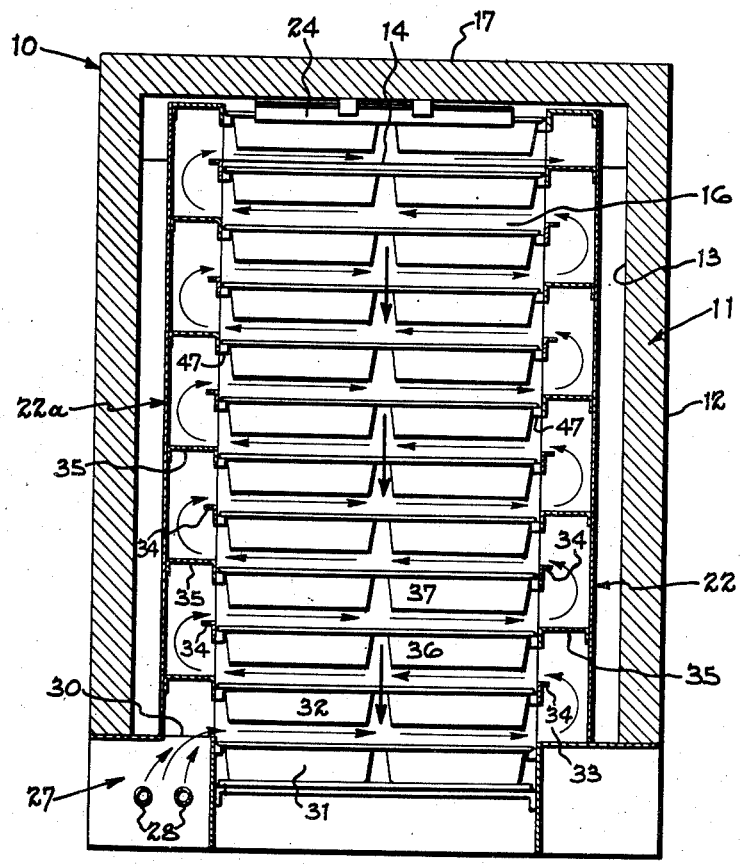
Figure 1 is a diagrammatic vertical sectional view through the oven showing the pan arrangement and path of gas flow in the "down" chamber.

Figures 1 and 2 show both the general arrangement of the oven and one preferred manner of carrying out the process of this invention. The structure of the oven will be explained in greater detail below, and this will be followed by a fuller explanation of the manner in which the proofing and baking steps are accomplished. When installed in a bakery, the oven is placed so that it may be charged with pans filled with raw dough, the pans preferably being transferred directly from the molder-panner to the oven. This transfer may be accomplished manually or automatically by means of a suitable conveyor mechanism, the important thing being that the pans are not routed to a proof room before they are charged into the oven. More specifically, the oven 10 includes a housing 11 which is preferably constituted by a metal outer shell 12 and an inner shell 13 insulated from one another. A vertical center wall 14 extends transversely through the housing dividing it into an "up" chamber 15 and a "down" chamber 16. The top of wall 14 is spaced from the top 17 of the oven a sufficient distance to permit passage of the pans 18 from the up chamber to the down chamber over the top of the center wall.

The straps of pans 18 containing the dough pieces are fed into the oven through charging opening 20, preferably located in the front wall of the housing at a point convenient for the operator. The pans are fed, either by hand or from a suitable conveyor (not shown), to a transfer mechanism 21. The transfer mechanism 21 advances the trays serially into engagement with the hold and lift ladders 22 and 23 which function to move the trays upwardly in chamber 15 and downwardly in chamber 16 in a step by step movement as will be explained below. A shuttle mechanism 24 is mounted at the top of housing 11, and is effective to shift the trays from the ladders in the up chamber to the ladders in the down chamber. After the pans have passed through the down chamber, they are engaged by a second transfer mechanism 25 by means of which they are discharged from the oven to a position indicated at 26 from which they may be removed either by hand or a suitable conveyor arrangement (not shown).

The heating chamber 27 is located in the lowermost portion of the housing adjacent the down chamber. Heat may be supplied to this chamber in any suitable manner. Preferably, a combustible gas is supplied through pipes 28; this gas is burned within the chamber, and is mixed with air which is introduced into the chamber through a suitable opening (not shown). The air becomes heated, and the hot air and gases are then discharged from chamber 27 and introduced into down chamber 16 through opening 30. The hot air passes transversely across the down chamber between the two lowermost straps of pans indicated at 31 and 32. The pans themselves function as baffles to direct the air flow.

As the warm air emerges from between the lowermost rows of pans, it passes into hold ladder 22 which is a substantially channel shaped member having its open face disposed inwardly toward the pans. The air enters the lowermost space 33 of the hold ladder 22, passes over baffle bar 34, and is trapped under baffle plate 35 which prevents further rise of the air within the hold ladder. The air is thus channeled outwardly from the hold ladder, and again passes transversely across the down chamber; this time between the second and third straps of pans 32 and 36. The air moves between these straps of pans, in a direction opposite its previous travel, until it enters the opposite hold ladder 22a where it is trapped between baffle bar 34 and baffle plate 35. The air passes over baffle bar 34, and emerges from the hold ladder between that baffle bar and baffle plate 35.

The warmed air travels back and forth across the down chamber, in this same fashion, until it reaches the top of down chamber 16. It then passes over the top of wall 14 and enters up chamber 15 where it descends in a serpentine fashion, passing back and forth between adjacent rows of pans in the same manner that it previously ascended in chamber 16. The baffle arrangement in the down chamber is identical with that in the up chamber, the only difference being that in the up chamber it is effective to channel the warm air in a descending path rather than in an ascending one.

The air is withdrawn from the lower portion of the down chamber through an exhaust opening (not shown). The opening preferably is connected to a flue or other means for providing a slight pressure head to draw the air through the oven. The light arrows in Figures 1 and 2 represent the general direction of gas flow, while the heavier arrows indicate the direction of pan movement.

Figure 6:
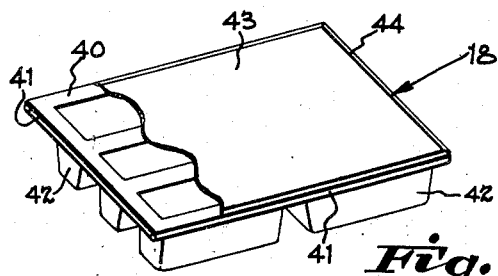
Figure 6 is a perspective view of a strap of pans, the cover plate being partially broken away.

One preferred form of pan for use with this oven is shown in Figure 6. As there shown, a strap of pans 18 is constituted by a rectangular plate 40 having a beaded peripheral edge 41; a plurality of spaced dough wells or pans 42 depend from the plate 40. The beaded edge 41 extends outwardly beyond the edges of the pans, and is adapted for engagement with the hold and lift ladders. A cover plate 43 having an overturned edge 44 is adapted for placement on top of the plate 40 to cover up the openings of wells 42. The cover plate 43 does not, however, form a hermetic seal with the pans, and gas and moisture can enter or escape from the pans between plate 40 and cover 43.

The hold and lift ladders are shown in more detail in Figures 3, 4, and 5. As there shown, the hold ladder 22 includes a U-shaped frame 45, the open end of which extends toward the interior of the oven. A plurality of baffle bars 34, preferably constituted by right angled members, are secured as by spot welding to arms of frame 45. These baffle bars extend across the open end of the hold ladder, and are preferably arranged so that one portion of the bar extends vertically along the inner edge 46 of the ladder and the angulated portion of the bar extends horizontally toward the interior of the ladder. A support bar 47 is secured to the hold ladder at a point spaced downwardly from the angulated upper portion of each baffle bar.

Disposed intermediate each pair of baffle bars is a baffle plate 35, the baffle plate extends horizontally across the hold ladder, and is effective to prevent vertical passage of gas within the ladder. Baffle plate 35 includes a front flange 48 and a rear flange 50, both flanges being spot welded, or otherwise secured, to the hold ladder. A support bar 47 is also secured to the inner edge of the hold ladder at a point spaced downwardly from each of the baffle plates. The support bars are regularly spaced so that irrespective of whether the support bar is associated with a baffle plate or a baffle bar, it is the same distance from the support bar above it and the one below it.

The lift ladder 23 is constituted by two vertical members 51—51, which are maintained in parallel relationship by one or more U-shaped cross braces 52. Each vertical member 51 includes a plurality of pan engaging fingers 53 which are spaced vertically from one another the same distance that the support bars 47 of the hold ladder are spaced from one another. The arms of cross brace 52 and vertical members 51 are spaced apart a distance greater than the width of the hold ladder 22. As a result, the hold ladder may be embraced within the vertical members and cross brace of the lift ladder, as shown in Figure 5, so that both the support bars 47 and pan engaging fingers 53 can simultaneously engage the beaded edge 41 of a strap of pans 18.

The hold ladder is mounted for movement along a horizontal line so that it can be advanced toward, or retracted from, a position in which support bars 47 engage the edges of pan 18. The lift ladders 23 are mounted for rectilinear movement; that is, these ladders can be moved up or down in a vertical plane and inwardly or outwardly in a horizontal plane, toward or away from a position in engagement with the pans.

In operation, the pans are fed by the shuttle mechanism into a position in which they rest on the lowermost support bars 47 of the two hold ladders in the up chamber. The lift ladders are then advanced so that both the lift ladders and hold ladders engage the pans. The advancing motion of the lift ladders is represented diagrammatically at 55 in Figure 4. After the lift ladder has reached its advanced pan engaging position at 56, the hold ladders are retracted out of engagement with the edges of the pans. The lift ladders are then shifted vertically, as indicated at 57, until the pans have been raised in amount corresponding to the distance between adjacent support bars 47 of the hold ladder. When the pans have been so advanced, as indicated at 58, the hold ladders are brought back into engagement with the pan edges. Subsequently, the lift ladders are withdrawn from engagement with the pans as indicated at 60, the pans being supported now solely by the hold ladders. After the lift ladders are free of the pans, they are lowered an amount equal to the distance they were previously raised. This movement is indicated at 61. The cycle is then repeated beginning with an inward movement of the lift ladders as shown at 62.

The exact mechanism for moving the ladders in this timed relationship constitutes no part of the present invention, and any suitable mechanism may be employed. The same mechanism can be employed to power the shuttle device 24 which shifts a strap of pans from engagement with the uppermost support bars of the hold ladder in the up chamber, to engagement with the uppermost set of support bars in the hold ladders of the down chamber.

The movements of the hold and lift ladders in the down chamber are essentially the same as those in the up chamber. However, the sequence is reversed so that the lift ladders engage the pans during their downward travel, the hold ladders being retracted; while the hold ladders engage the pans during the period in which the lift ladders are raised. In this manner the pans are shifted in a step by step movement upwardly in the up chamber, across the top of the dividing wall 14, and downwardly in the down chamber to the discharge opening.

When baking loaves in accordance with this invention, the raw dough, which has been sheeted but not proofed, is supplied to the oven in loosely covered pans. The covers are effective to retain a portion of the moisture and gases liberated during the baking process, but the pans are not hermetically sealed so that moisture and gases can escape or enter the bread compartments. When the pans first enter the oven through the charging door, they are surrounded by air at a relatively low temperature (preferably of the order of 120°), the air at that point having passed over all of the pans in the oven, and thereby given up a large portion of its heat. As the pans progress through the oven, they continually come into contact with air which is warmer than that to which the dough has previously been exposed. This process continues until the dough reaches a position near the discharge opening of the oven where it is subjected to the newly entering gases which are at the maximum baking temperature, and of a relatively low humidity. The exact maximum temperature can be selected by the baker in order to produce the type of loaf he desires from the particular dough he employs. I have determined, however, that a loaf of excellent quality can be produced using a maximum temperature of 350° as compared with a temperature of from 400° to 500° as currently utilized.

During approximately the first half of its travel through the oven, the dough is heated and proofed. The dough is initially placed in an atmosphere at a temperature in the order of 120° F. While this temperature is not particularly critical, and the initial temperature may vary an appreciable amount above or below this figure, the initial temperature can generally be characterized as being an appreciable amount above the normal proofing temperature and yet only a small fraction of the normal baking temperature. The heat supplied to the dough is effective to aid in the generation of gas from the yeast, so that the dough lumps begin to expand and give off moisture. Most of this moisture is entrapped within the pan, so that in a sense the dough produces its own humid atmosphere which further aids the proofing process. Simultaneously, heat starts to flow into the core of the lump to raise its temperature.

As the dough progresses through the oven, it comes into contact with warmer and warmer air, and by the time it reaches the top of the up chamber, the dough has expanded to its final volume and the core temperature has risen to approximately 210°, its full baking temperature. During the last half of its oven travel, the dough is surrounded by still warmer air, the air now being at a sufficient temperature to evaporate the moisture from the pan and partially dehydrate the loaf itself. This dehydration of the loaf is accompanied by the formation of a soft even crust which appears on each of the sides of the loaf.

It should be noted that when dough is baked in closed pans, the liberated moisture from the loaf is initially entrapped within the pan and in effect performs two functions. In the first place, it aids the proofing process, and secondly, it inhibits crust formation and thereby tends to keep the dough in a good heat conductive state. (Bread crust being cellulosic in nature is an extremely poor heat conductor.) The entrapped moisture is driven off from the pan only after the core of the loaf has been raised to baking temperature, and the heat transfer properties of the loaf are no longer of extreme importance.

While I have disclosed the baking and proofing process as employed with covered baking pans, it will be understood that this process can also be utilized with dough which is baked in open pans. When producing a loaf of open hearth bread in accordance with this invention, the dough is deposited in open baking pans and is again charged into the oven directly from the molder-panner. A countercurrent flow of air is provided, and the temperature conditions in the oven are maintained generally as they exist when covered pans are employed. However, it may be desirable to employ slightly lower temperatures when baking open hearth bread, especially if a light crust is desired.

The countercurrent relationship of the dough movement and air stream presents a unique advantage when baking open hearth loaves since the humidity and temperature conditions of the air stream are continuously varied so as to approximate the optimum conditions for processing the dough. That is, the air in the up chamber is at a lower temperature and greater humidity than the air in the down chamber, since the air in passing over the dough gives up heat and absorbs moisture.

This relatively humid and moderately warm air provides an atmosphere which facilitates the obtaining of a good proof. Then after the dough has expanded, and its core has been heated, dehydration and crustation take place in the hotter drier portions of the air stream.

Having described my invention, I claim:

1. The method of proofing and baking bread which comprises disposing pieces of dough in an environment having a temperature appreciably in excess of 90° F., and gradually increasing the temperature of said environment until it reaches the maximum temperature required for baking, the temperature becoming high enough to dehydrate the dough only after the core of the lump has reached a temperature of substantially 210° F.

2. The method of proofing and baking bread which comprises depositing dough in baking pans, moving the pans in countercurrent relationship to a stream of warm air having a predetermined temperature to expand the dough and vaporize a portion of the moisture therein and thereby proof the dough, the moisture vaporized from the dough forming a humid atmosphere surrounding the dough to aid the proofing thereof, and thereafter subjecting the dough to a higher temperature for baking said dough.

3. The method of proofing and baking bread which comprises depositing dough in baking pans, moving the pans in countercurrent relationship to a stream of warm air having a predetermined temperature to expand the dough and vaporize a portion of the moisture therein to thereby proof the dough, the moisture vaporized from the dough forming a humid atmosphere surrounding the dough to aid the proofing thereof, and thereafter baking the dough by passing the pans in countercurrent relationship to a stream of warm air of considerably higher temperature.

4. The method of proofing and baking bread which comprises depositing dough in baking pans, moving the pans in countercurrent relationship to a stream of warm air, to expand the dough and vaporize a portion of the moisture therein to thereby proof the dough, the moisture vaporized from the dough forming a humid atmosphere surrounding the dough to aid the proofing thereof, and thereafter baking the dough by passing the pans in countercurrent relationship to the same stream of warm air, the temperature of the air stream in contact with pans varying from a temperature of the order of 120° F. where the stream first contacts the pans to the highest temperature required for baking.

5. The method of proofing and baking bread which comprises depositing dough in covered baking pans, proofing the dough by moving the pans in countercurrent relationship to a stream of warm air, whereby the dough is expanded and a portion of the moisture therein is vaporized and trapped in the pans to create a humid atmosphere surrounding the dough, and thereafter baking the dough by passing the pans in countercurrent relationship to the same stream of warm air, the pans entering the air stream at a place where the temperature of the stream is appreciably in excess of 90° and emerging from the stream at a place where the temperature of the stream is substantially the highest temperature desired for baking, the pans and air stream moving countercurrent at a rate such that the core of the dough reaches baking temperature before the dough is dehydrated and encrusted.

6. The method of proofing and baking bread which comprises the steps of depositing dough in baking pans, proofing the dough by exposing it to air at a temperature appreciably in excess of 90° F. to expand the dough and vaporize a portion of the moisture therein, and thereafter exposing the dough to air of gradually increasing temperature to further proof and bake the dough before finally removing the dough from contact with the air after the temperature of the air has reached the highest temperature desired for baking, the humidity of the air decreasing as the temperature of the air increases, the air being maintained sufficiently humid to aid proofing and inhibit evaporation and encrustation until the dough has substantially completed its expansion.

7. The method of proofing and baking dough which comprises the steps of depositing dough in baking pans, moving the pans in countercurrent relationship to a stream of heated air, the air being heated prior to contact with the dough and supplying substantially all of the heat for proofing and baking the dough, the temperature of the air initially contacted by the dough being such that the dough is expanded and a portion of the moisture in the dough evaporated so that the dough is proofed in a humid atmosphere created by the vaporized moisture, the dough thereafter being subjected to portions of the stream of air at substantially higher temperatures, whereby the dough is baked.

8. The method of proofing and baking dough which comprises the steps of depositing dough in baking pans, moving the pans in countercurrent relationship to a stream of heated air, the air being heated to at least the highest temperature desired for baking prior to contact with the dough and supplying substantially all of the heat for proofing and baking the dough, the temperature of the air initially contacted by the dough being of the order of 120° F. so that the dough is expanded and a portion of the moisture in the dough evaporated and the dough is proofed in a humid atmosphere created by the vaporized moisture, the dough thereafter being subjected to portions of the same stream of air at progressively higher temperatures, whereby the dough is baked.

References Cited in the file of this patent

UNITED STATES PATENTS

| | | |
|---|---|---|
| 139,802 | McKenzie | June 10, 1873 |
| 1,212,900 | Campbell | Jan. 16, 1917 |
| 1,394,674 | Flood | Oct. 25, 1921 |
| 1,395,211 | Snyder | Oct. 25, 1921 |
| 1,414,439 | Snyder | May 2, 1922 |
| 1,420,102 | Hilenbrant | June 20, 1922 |
| 1,488,252 | House | Mar. 25, 1924 |
| 1,672,954 | Pointon | June 12, 1928 |
| 2,168,391 | Bemis | Aug. 8, 1939 |
| 2,621,616 | Ames | Dec. 16, 1952 |

FOREIGN PATENTS

| | | |
|---|---|---|
| 197,846 | Great Britain | May 24, 1923 |